May 22, 1934.　　L. TAYLOR　　1,960,092
FRICTION CLUTCH OR COUPLING
Filed Dec. 20, 1932　　3 Sheets-Sheet 1

INVENTOR:
LEONARD TAYLOR
BY: Ruege + Bryce
ATTORNEYS

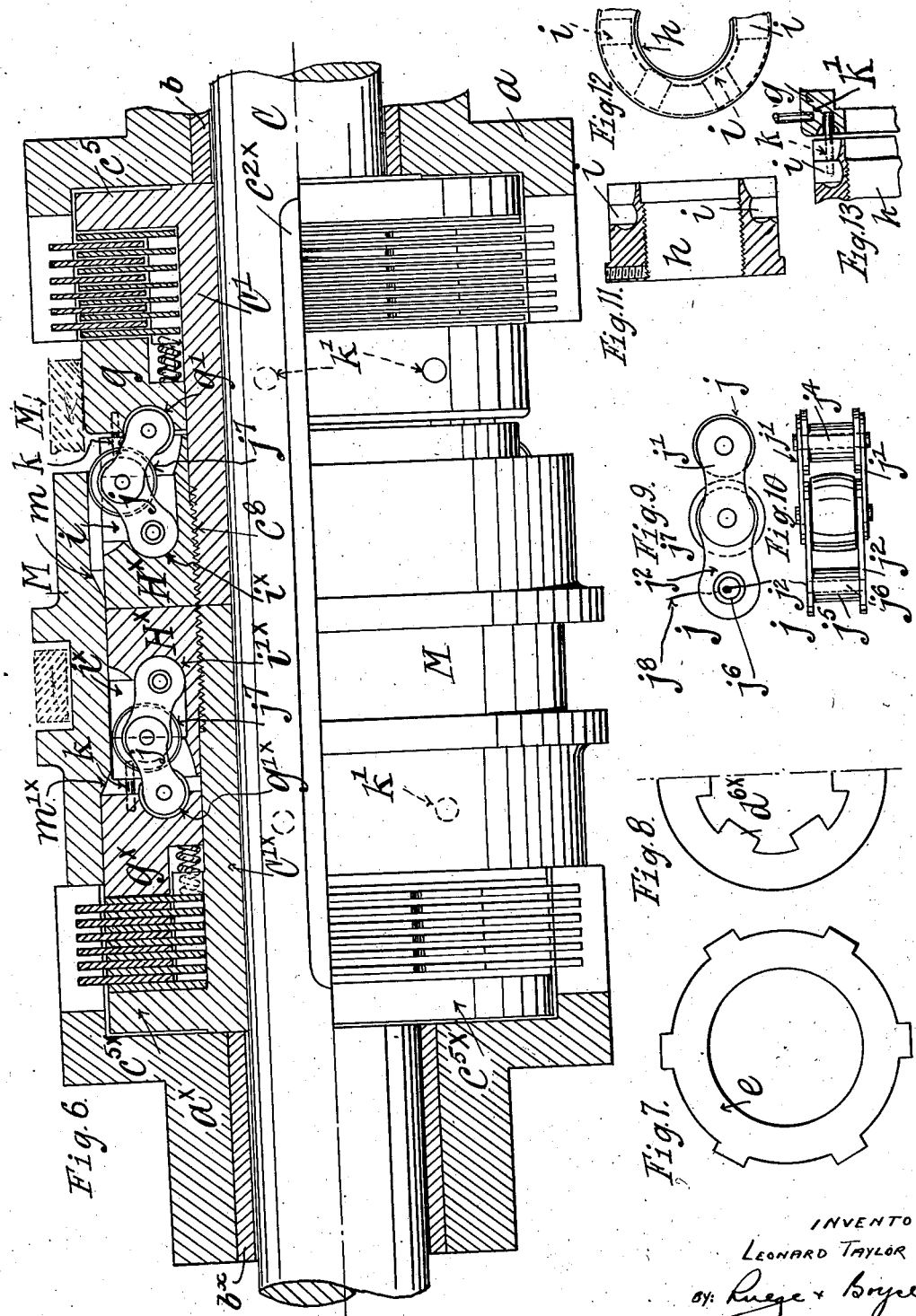

May 22, 1934.   L. TAYLOR   1,960,092
FRICTION CLUTCH OR COUPLING
Filed Dec. 20, 1932    3 Sheets-Sheet 3
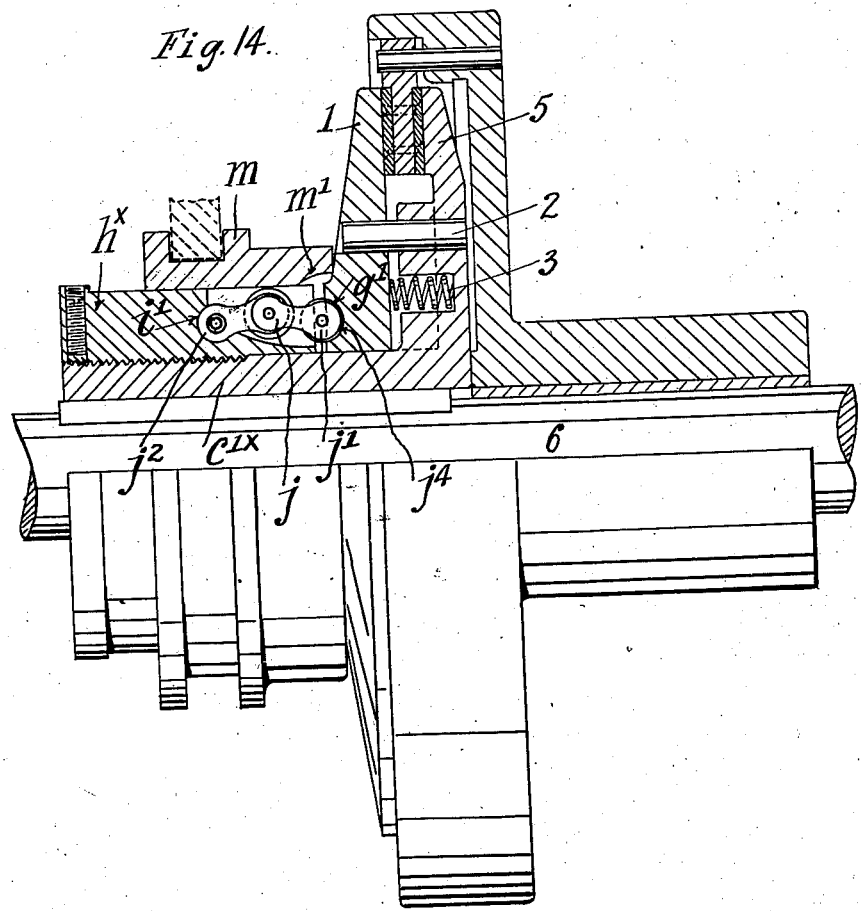
INVENTOR:
LEONARD TAYLOR
BY: Ruege + Boyce
ATTORNEYS.

Patented May 22, 1934

1,960,092

UNITED STATES PATENT OFFICE 1,960,092

FRICTION CLUTCH OR COUPLING

Leonard Taylor, Trows Upper Works, Castleton, England

Application December 20, 1932, Serial No. 648,062
In Great Britain February 23, 1932

2 Claims. (Cl. 192—93)

This invention relates to friction clutches or couplings and is concerned with the production of simple and compact clutches or couplings.

The salient feature of novelty is the use of a number of clutch operating elements in the form of units or sets of chain links, in units or sets of two links and spaced radially around an axis of rotation, and located in pockets in a ring, and adapted to be acted upon by a sliding striking device or cam-like structure which influences said units or sets of two links or rather a roller device combined therewith. The units or sets of two chain links are intended to function in this manner, that when acted upon to force each two chain links into alignment a clutching action takes place, the clutching action going off as alignment is departed from.

A number of units or sets of two chain links of substantially standard or other pitch chain are used and each two chain links are held by the three pins, a roller of a proper diameter being mounted on the middle pin. If a sliding striking device with cam arrangement is provided, it can be operated to tend to force the two chain links into alignment, or permit same to go out of alignment, thus effecting clutching or unclutching.

My improvements are hereafter described in connection with several types of friction clutch and are illustrated by the accompanying drawings, wherein:—

Figs. 2 and 3 show separately two of a series of successive friction discs which are subjected to end pressure when the clutch is on.

Fig. 6 shows a double construction of friction clutch embodying the operating units or sets of two chain links in respect of each of the combined clutches.

Figs. 7 and 8 are separate views of a series of alternate friction discs.

Figs. 9 and 10 are separate side elevation and plan of one complete unit or set of two chain links.

Fig. 11 is a sectional view and shows the adjustable ring with pockets in which the units or sets of two chain links are disposed.

Fig. 12 is a broken end view of Fig. 11.

Fig. 13 is a detail view to be examined with Fig. 6.

Fig. 14 shows another type of friction clutch controlled by the operation of several units or sets of two chain links.

Referring in the first place principally to Figs. 1 to 5, there is shown an external clutch half $a$, which may run on a bush $b$ and have a boss-like portion upon which a gear wheel or pulley can be mounted, said boss-like portion being applied upon the bush $b$ carried on the shaft $c$ and being suitably held in place in known way.

Figure 4:
Figs. 4 and 5 show two of a successive series of modified friction discs which may be substituted for those illustrated at Figs. 2 and 3.
Figure 5:
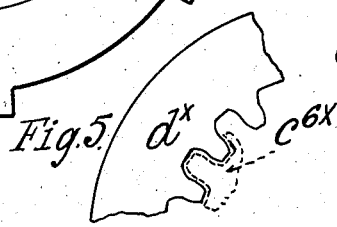

On the shaft $c$ is mounted a long sleeve $c^1$ fixed by a key $c^2$ and having its sleeve-like portion turned to two diameters $c^3$, $c^4$, and with an inner end flange $c^5$. Said long sleeve $c^1$ is cut with spaced notches $c^6$, and the inner opposing face of the internal clutch half $a$ is cut with spaced gaps, these being lettered $a^6$. A considerable number of toothed discs or plates marked $d$, $e$ of steel or such like, but preferably alternately one of steel and one of asbestos or other fibrous material, are threaded upon the machined portion of the long sleeve $c^1$ having the gaps $c^6$, so that their teeth marked $d^6$, $e^6$ engage the spaced notches $c^6$, $a^6$, and produce a multi-plate clutch combination of the well known "Weston" or like type. Instead of the discs $d$, $e$, shown at Fig. 1 and by Figs. 2 and 3, alternate discs one of steel and one of asbestos or like material may be used such as are indicated in Figs. 4 and 5 and marked $d^x$, $e^x$, and having a succession of internal and external teeth, the notch-like features at $c^{6x}$, $a^{6x}$ being correspondingly shaped.

Slidable upon the turned diameter of the sleeve $c^1$ is a shaped pressure ring $g$ which can act upon the assembled discs $d$, $e$, small springs $f$ held in pockets $f^1$ tending to thrust the shaped pressure ring $g$ out of action. The outer end of the sleeve $c^1$ has a screw-thread $c^8$ cut thereon and a shaped adjustable ring $h$ is utilized with locking screw $h^1$ to retain adjustment of the ring $h$ upon the screw-thread $c^8$.

Figure 1:
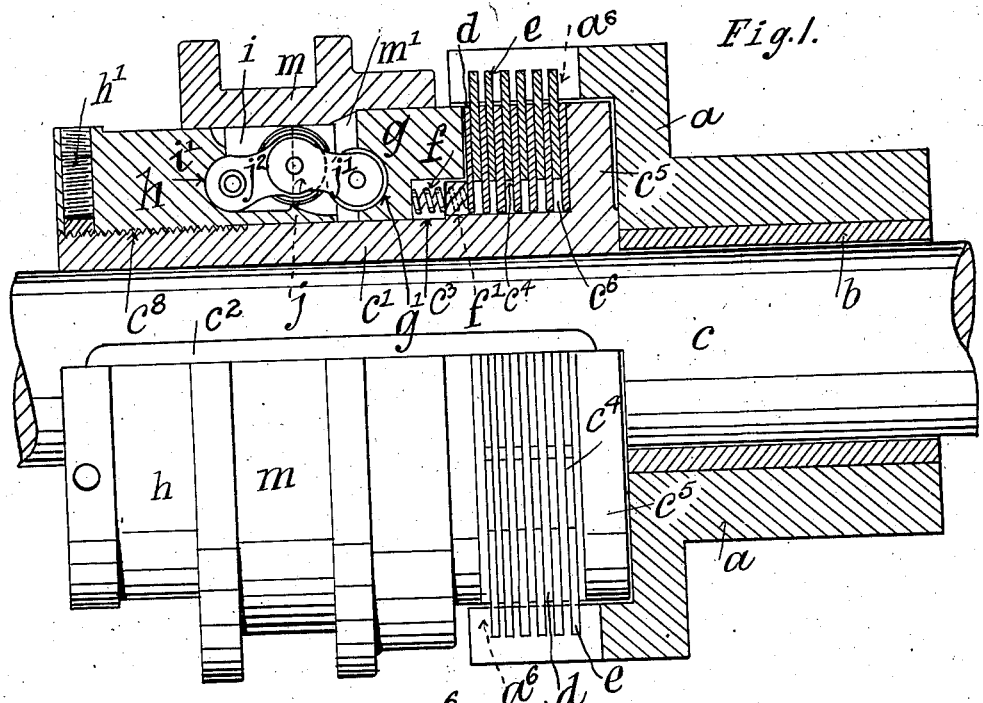
Fig. 1 shows, partly in section, a single clutch of the multiple disk type, one complete unit of the operating two chain links being clearly shown.
Figure 2:
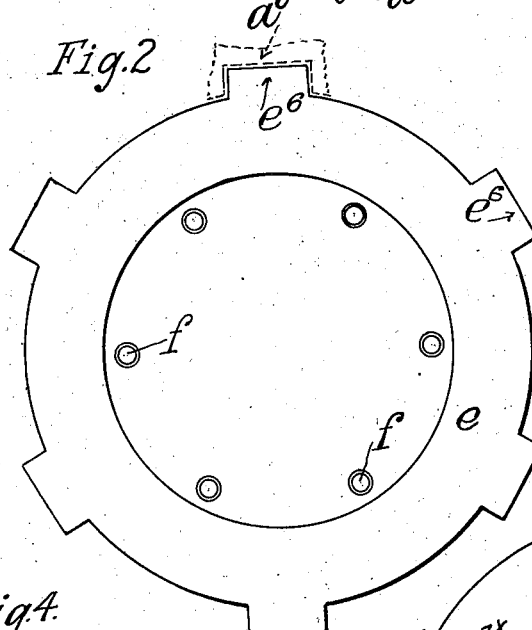
Figure 3:
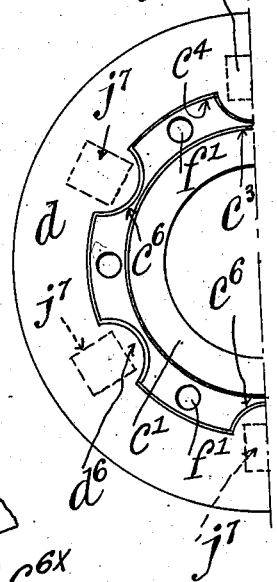

The spaced units or sets of two chain links are shown at Fig. 1 (and very clearly by Figs. 9 and 10) and are disposed between the shaped pressure ring $g$ and the shaped adjustable ring $h$. They are located in suitable pockets, housings or compartments, say 2 or more in a clutch structure, six being a convenient number as suggested in certain figures of the drawings, the pockets providing for the radial pitching and positioning of the units or sets of two chain links.

In the drawings, the pockets are marked $i$, and each unit or set of two chain links is marked $j$ as a whole and comprises links $j^1$, $j^2$, a flanged revolvable barrel $j^4$, a spacer $j^5$, and a revolvable mid-roller $j^7$. Each unit or set of two chain links $j$ is disposed in its pocket $i$ (see Fig. 1) and the flanges of the revolvable barrel $j^4$ fit in an annular groove $g^1$ in the shaped pressure ring $g$, whilst the chain links $j^2$ partly extend into a rounded cavity $i^1$ formed in connection with each pocket $i$. The pockets $i$ are machined out to shape as indicated at Fig. 13.

Working upon and around the shaped pressure ring $g$, and the shaped adjustable ring $h$, is a type of striking device such as $m$ (see Fig. 1)

which has a shaped internal cam face or incline which has a shaped internal cam face in the $m^1$. This striking device, by its cam face in the internal bore acts on the three pins in the units or sets of two chain links, and operates to cause an approach to alignment of the several units or sets of two chain links, or permits this condition to be departed from. Thus, the shaped pressure ring $g$ is moved forward to effect clutching, by jambing the series of friction discs $d$, $e$; or same is forced back (by the sprngs $f$) to permit separation of the friction discs for de-clutching. Such actions are effected according to the position of the striking device $m$.

The shaped ring $h$ can be set up or adjusted upon the screw-threaded sleeve $c^1$, the latter being shown keyed at $c^2$ upon the shaft $c$.

As to whether the shaft $c$ is driven or is the driver is not material, nor is the manner of taking or conveying the drive.

A clutch, such as described, is wholly encased and very suitable for use in a gear box for drives in connection with machine tools.

Units or sets of two chain links with mid-roller, and marked as a whole $j$, are readily available which are uniform and accurate in size and can be instantly applied between shaped pressure ring $g$ and adjustable ring $h$, and are effectively operated by an encircling striking device.

The Fig. 6 shows a double type of clutch embodying my improvements. In Fig. 8 the teeth $d^{6x}$ on the disc $d$ are slightly different in shape.

Referring to Fig. 6, the construction is very similar as to most of the parts to the clutch already described, but modifications are requisite to the double clutch structure illustrated.

The parts on the right-hand half of Fig. 6 which are similar to the construction already described have received the same reference letters, whilst those on the left-hand have been distinguished by a "$x$" added to the reference letter. Other parts which are slightly different have received a different reference letter.

In the example Fig. 6, two screwed sleeves $C^1$, $C^{1x}$, with flanges $c^5$, $c^{5x}$ are used, the same being held on the shaft $C$ by a key $c^{2x}$. The adjustable rings are marked $H^x$, $H^x$, and are screwed in place upon the screwed sleeves $C^1$, $C^{1x}$, and said sleeves when mounted on the shaft $C$ and engaging the key $c^{2x}$ abut end to end, as the Fig. 6 shows. Each abutting clutch structure has its complement of units or sets of two chain links with mid-roller $j^7$ and marked as a whole $j$ and mounted in the appropriate pockets $i$, $i^x$.

The slidable striking device M has two internal inclined faces $m^1$ and $m^{1x}$ and is capable of occupying three positions, when moved by a fork or the like. In the position on the left-hand as shown in full lines, Fig. 6, the links of the complement of units or sets of two chain links with mid-roller, (marked as a whole $j$) are pressed down and the left-hand clutch structure conveys the drive, whilst the clutch structure on the right-hand (Fig. 6) is out of action. If the striking device M be moved towards the right-hand, as indicated by dotted lines, then the right-hand clutch will come into action and the left-hand clutch will go out of action. If the striking device M be in a mid-position, then both clutches are off. The shaft C in this example may be the driver and either clutch can convey the drive, or this can be varied in any way obvious to those skilled in the art.

In order to set up the adjustable rings $H^x$, $H^x$, to compensate for wear of the friction discs such as $d$, $e$, the pressure rings $g$, $g^x$, may be coupled by interconnecting rods $k$, whereby, if a "tommy" bar be inserted in one of the holes $k^1$, the particular adjustable ring being thus coupled to the pressure ring $g$, or $g^x$, the latter can be set up slightly towards the group of friction discs.

The Fig. 14 shows a modified construction of friction clutch embodying features similar to those already described. A disc 1 guided on spindles 2 and acted on by springs 3 is slidably mounted on the screwed sleeve $c^{1x}$ of a disc 5 keyed on a shaft 6. On said screwed sleeve an adjustable ring $h^x$ with radial pockets $i$ is mounted. In these pockets $i$ the units or sets of two chain links $j$, with mid-roller $j^7$, are mounted, and the two link extremities $j^2$ and the revolvable barrel $j^4$ engage the one a cavity $i^1$ in each pocket $i$ of the adjustable ring $h^x$ and the other an annular groove $g^1$ in the disc 1. A striking device $m$ with cam incline $m^1$ is provided and slides upon the adjustable ring $h^x$ and operates to press down or release the complement of units or sets of two chain links $j$ with mid-rollers $j^7$, all as will be clear to the reader.

By forming a hole $j^6$ through the links $j^2$ and spacer $j^5$ (Fig. 10), a wire $j^8$ can be passed through the complement of units or sets of two chain links $j$ (see Fig. 9) to keep the latter in position when assembling in the pockets $i$.

Clutches constructed as described are cheap, powerful, compact, and small in over-all dimensions, and are capable of operating at high speeds.

I claim:

1. A friction clutch or coupling adapted to be carried upon a shaft, and comprising disc elements capable of being acted upon end-on, means to support and engage said discs, means to enclose said discs, provision on said discs to establish driving connection between said support means and said enclosing means, screwed sleeve provision about said main shaft, pressure ring provision, pockets in the screwed sleeve provision and in the pressure ring provision, units of two chain links located in said pockets, a revolvable mid-roller carried about the centre pin of each unit of two chain links, and a slidable cylindrical striking device disposed about the units of two chain links, and cam provision within the internal bore of the slidable cylindrical striking device, said slidable cylindrical striking device being adapted to act upon the revolvable mid-roller of each unit of two chain links.

2. A friction clutch or coupling adapted to combine with a main shaft, a screw threaded sleeve mounted thereon, discs disposed about said screw-threaded sleeve, a slidable pressure ring mounted on said screw-threaded sleeve, an adjustable ring mounted on said screw-threaded sleeve, pockets therein, a plurality of units of two chain links, a revolvable mid-roller carried about the centre pin of each unit of two chain links, a cylindrical slidable striking device movable about the screw-threaded ring, an interior cam face on the internal bore of the cylindrical slidable striking device adapted to co-operate with the mid-rollers of each unit of two chain links, and means to engage and enclose the discs, and provision for taking-up wear, all as set forth herein.

LEONARD TAYLOR.